(12) United States Patent
Dangel

(10) Patent No.: US 6,958,007 B2
(45) Date of Patent: Oct. 25, 2005

(54) WORKING CHAMBER

(75) Inventor: Matthias Dangel, Bamberg (DE)

(73) Assignee: Rosler Oberflachentechnik GmbH, (DE)

( * ) Notice: Subject to any disclaimer, the term of this patent is extended or adjusted under 35 U.S.C. 154(b) by 0 days.

(21) Appl. No.: 10/810,472

(22) Filed: Mar. 26, 2004

(65) Prior Publication Data
US 2004/0192167 A1 Sep. 30, 2004

(30) Foreign Application Priority Data
Mar. 28, 2003 (DE) .............................. 103 14 181

(51) Int. Cl.[7] .............................................. B24C 9/00
(52) U.S. Cl. ........................................ 451/89; 451/75
(58) Field of Search ............................. 451/89, 75, 80, 451/82, 38

(56) References Cited

FOREIGN PATENT DOCUMENTS

| DE | 101 20 473 C1 | | 4/2001 | | |
|---|---|---|---|---|---|
| DE | 100 07 831 | * | 8/2001 | ............ | B24C 9/00 |
| DE | 100 07 831 C1 | | 8/2001 | | |
| DE | 102 30 396 A1 | | 1/2004 | | |
| EP | 1 378 326 A1 | | 1/2004 | | |
| JP | 9-193020 | * | 7/1997 | ............ | B24C 9/00 |
| JP | 09 193020 | | 7/1997 | | |

OTHER PUBLICATIONS

German Search Report Feb. 9, 2004.
German Search Report Feb. 9, 2004
European Search Report Jul. 8, 2004.
European Search Report Jul. 8, 2004.

* cited by examiner

Primary Examiner—Dung Van Nguyen
(74) Attorney, Agent, or Firm—Sierra Patent Group, Ltd.

(57) ABSTRACT

A working chamber for a blasting process has a robot arm for the manipulation of a workpiece to be blasted, with the working chamber having a chamber wall with an access opening for the introduction of the robot arm. A sealing device rotatably fastened to the robot arm is provided in the region of the access opening.

1 Claim, 2 Drawing Sheets

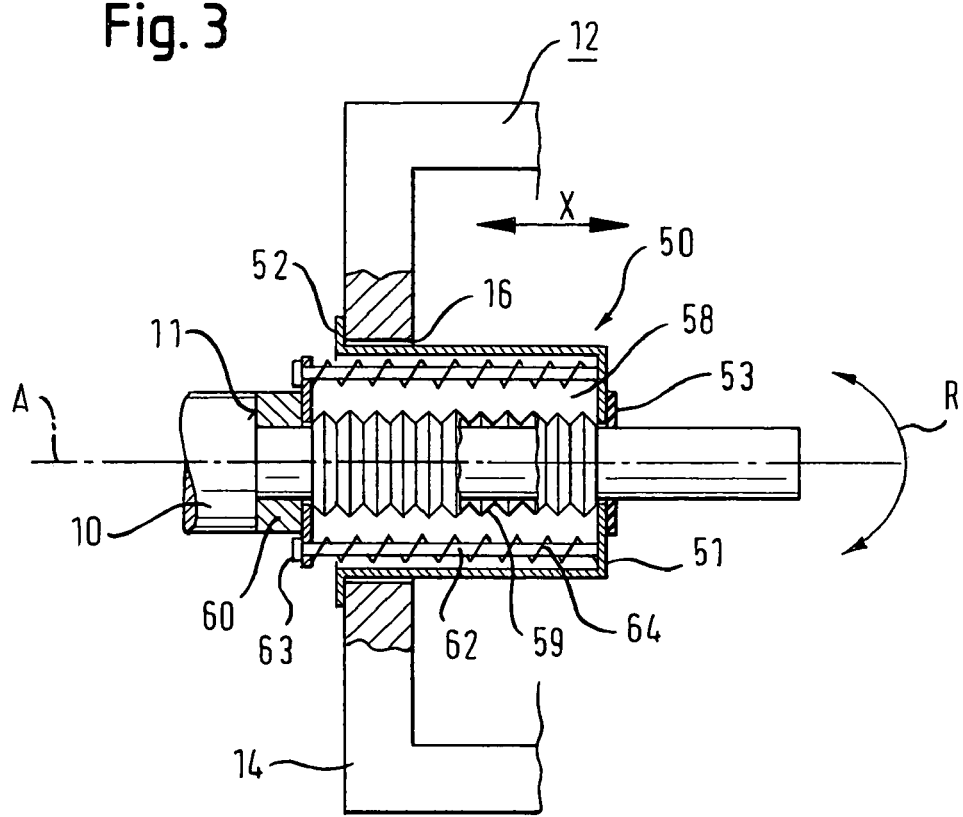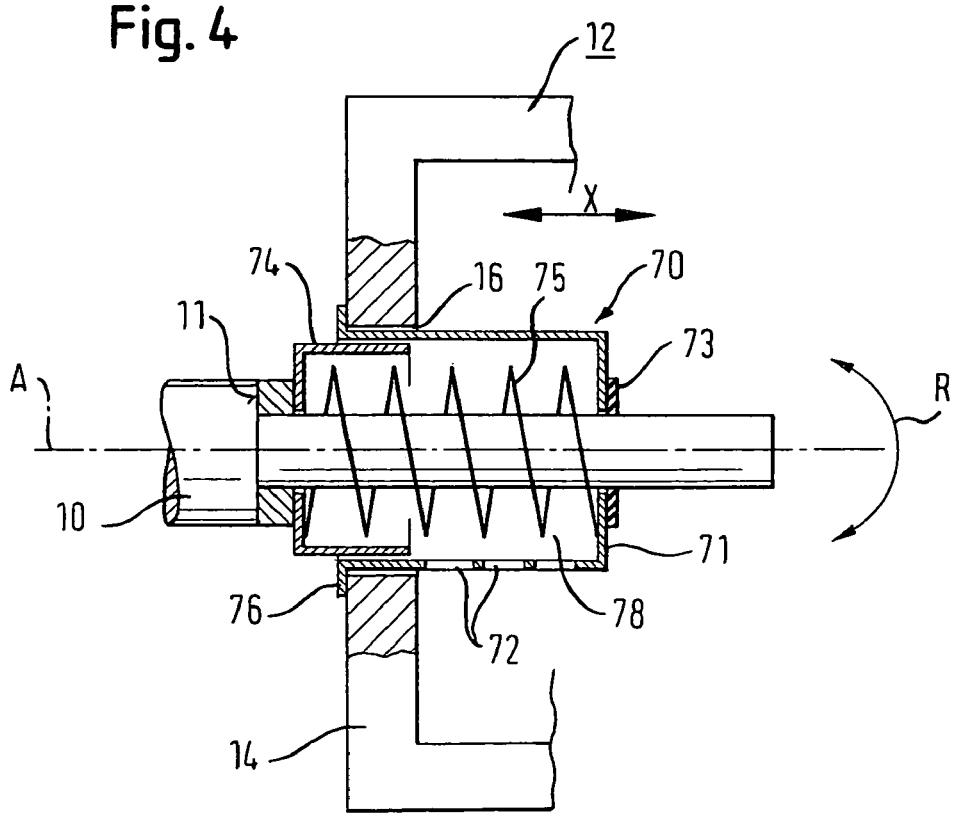

WORKING CHAMBER

PRIORITY CLAIM

This application claims priority to German Patent Application Number 103 14 181.2, filed on Mar. 28, 2003.

BACKGROUND

The present invention relates to a working chamber for a blasting plant which is provided with a robot arm for the manipulation of a workpiece to be blasted, with the working chamber having a chamber wall with an access opening for the introduction of the robot arm and with a sealing device being provided in the region of the access opening and making a seal between the robot arm and the chamber wall.

Workpieces, in particular workpieces of a complex shape, can be blasted in such a working chamber, with the workpieces being put in and taken out of the working chamber with the help of the robot arm. The sealing device in this process must ensure that no blasting medium can escape from the working chamber in the region of the access opening during blasting. In certain applications, it can be desirable in this process to move the robot arm and thus the workpiece during the blasting process. In this case, the sealing device must permit a movability of the robot arm along or about an axis.

SUMMARY

It is the object of the present invention to further develop a working chamber of the initially named kind such that a particularly cost favorable seal, that is a less complex seal in a construction and apparatus respect, is possible between the robot arm and the working chamber.

This object is satisfied in particular in that a sealing element is fastened to the robot arm which is rotatable about the longitudinal axis of the robot arm and which provides a seal between the latter and the chamber wall when the robot arm is introduced into the chamber.

In accordance with the invention, the seal between the robot arm and the chamber wall can be achieved particularly easily in a construction respect in that the robot arm with the sealing element fastened to it is held pressed against the chamber wall during the blasting process so that a sealing is ensured and nevertheless a rotational movement of the robot arm is possible in order to achieve a good blasting result.

In accordance with the invention, no moving parts are required—with the exception of the sealing element rotatable about the longitudinal axis of the robot arm. The sealing device in accordance with the invention does not have to be latched or otherwise coupled so that the cycle times for the blasting of a workpiece are minimized, since the robot arm, to whose front end a workpiece to be blasted is fastened, only has to be moved into the working chamber and be kept pressed against the chamber wall with a pre-determined minimum pressing force. Since the sealing element is rotatable relative to the robot arm, the latter can also rotate relative to it when the sealing element is pressed onto the chamber wall.

Construction savings can thus be achieved in accordance with the invention, on the one hand. A minimization of the cycle time is possible, on the other hand.

Advantageous embodiments of the invention are described in the description, in the drawing and in the dependent claims.

In accordance with a first advantageous embodiment, the sealing element can be brought into a sealing engagement with the chamber wall solely by pressing the robot arm against the chamber wall. In this embodiment, all latching elements such as control cylinders, magnetic closures or the like are omitted, whereby very good conditions are created for a reduction in the construction effort and in the achievable cycle times.

In accordance with a further embodiment of the invention, a sealing element can be provided not only on the robot arm, but also on the chamber wall, with these two sealing elements being able to cooperate with one another. It is, however, generally sufficient for a sealing element only to be provided at the robot arm, with the sealing element moving into engagement with the rim of the access opening in the sealed state.

In accordance with the invention, the sealing element does not necessarily have to be made in one piece. It is thus possible in accordance with a further embodiment of the invention for the sealing element to have two parts of which one is firmly fastened to the robot arm and the other is rotatable about the longitudinal axis of the robot arm.

In accordance with a further advantageous embodiment, the sealing element not only has contact outside the working chamber, but extends up to and into the interior of the working chamber when the robot arm is introduced into the working chamber. With such an embodiment, the sealing element has an extent in the longitudinal direction of the robot arm, whereby a design becomes possible which permits the robot arm not only to be rotated during the blasting process, that is in the sealed state, but also to be moved along its longitudinal axis. Such an embodiment can be obtained, for example, in that the sealing element has two parts which can be telescoped, that is which can be pushed into one another, whereby a sealing is maintained between the robot arm and the chamber wall despite a linear movement of the robot arm.

It can furthermore be advantageous in this process for the sealing element to have a hollow space which is provided with outlet openings for blasting media. Such a hollow space can, for example, have sealing sections in the manner of a labyrinth seal or a finned seal.

In accordance with a further advantageous embodiment, the sealing element can have a ring web which can be brought into engagement with the external periphery of the access opening. It is ensured in this embodiment that the sealing element is always held centered in the access opening when the blasting process starts.

In accordance with a further advantageous embodiment, at least part of the sealing element can be displaced relative to the robot arm along its longitudinal axis when the sealing element is pressed against the chamber wall by the robot arm. In this embodiment, a longitudinal displaceability of the robot arm also results in the sealed state.

In accordance with a further embodiment of the invention, the sealing element can be movable against the force of a spring in the direction of the longitudinal axis of the robot arm. In this embodiment in accordance with the invention, the sealing element is biased in the direction of the chamber wall by a spring such that even a withdrawal movement of the robot arm initially does not cancel the sealing engagement between the sealing element and the chamber wall. Only when the withdrawal movement of the robot arm exceeds a certain value does the sealing element release from the chamber wall together with the robot arm.

For a particularly good sealing, the robot arm can be protected by an additional seal, in particular by rubber bellows, inside the sealing element. It can also be advantageous to additionally arrange a wiper element at the side of the sealing element directed toward the working chamber such that an additional seal is provided between the robot arm and the actual sealing element on a withdrawal movement of the robot arm and with a sealing element simultaneously pressed against the chamber wall, for example by the force of a spring.

In accordance with a further aspect of the invention, it relates to a method for sealing between a chamber wall of a working chamber for a blasting unit and a robot arm introduced into the working chamber through an access opening, with a sealing element being fastened to the robot arm or to the chamber wall. In the method in accordance with the invention, either the robot is pressed against the sealing element with a specified minimum pressing force or, alternatively, the sealing element is pressed against the chamber wall directly or indirectly by the robot arm with said minimum pressing force at all times during a blasting process in order thereby to achieve a seal between the chamber wall and the robot arm.

A seal can be achieved in the simplest manner during the blasting process using the method in accordance with the invention in that the robot arm is always pressed against the chamber wall with such a minimum force that a seal is ensured. It is generally irrelevant in this process whether the sealing element is provided at the chamber wall or at the robot arm. It must only be ensured that the sealing effect is brought about by the robot arm itself which achieves the sealing effect with the specified minimum pressing force.

The method in accordance with the invention makes it possible for the robot arm to be rotated about its longitudinal axis and/or moved along its longitudinal axis during the blasting procedure, with the sealing effect being maintained in both cases.

If a sealing effect should also be ensured on a withdrawal movement of the robot arm, the minimum pressing force can be applied at least partly by the force of a spring.

BRIEF DESCRIPTION OF THE DRAWINGS

The present invention will be described in the following purely by way of example with reference to advantageous embodiments and to the enclosed drawings. There are shown:

FIG. 3 a third embodiment of a working chamber;
and
FIG. 4 a fourth embodiment of a working chamber.

DETAILED DESCRIPTION

Figure 1:
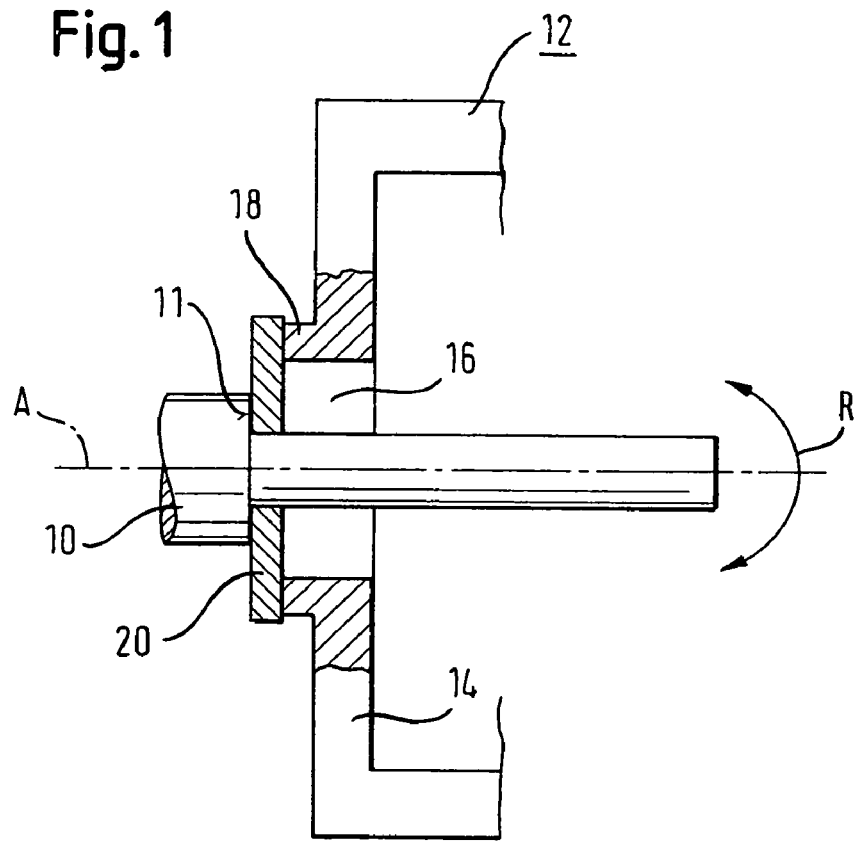
FIG. 1 a first embodiment of a working chamber.

Different embodiments of the invention will be described in the following with reference to the enclosed Figures, with the same reference numerals being used for the same components for a simplified representation.

FIG. 1 shows a first embodiment of a working chamber 12 for a blasting unit which is provided with a robot arm 10 for the manipulation of a workpiece (not shown) which is to be blasted and is fastened to the front end (the right end in the Figures) of the robot arm 10.

Within the framework of the present invention, the designation "robot arm" is understood as any part which can be manipulated by a robot drive and which is suitable to receive a workpiece. This means that the component designated with the designation "robot arm" can be either the robot arm itself or an adapter or the like screwed to it.

The working chamber 12, which is closed on all sides except at its front side, has a chamber wall 14 at its front side which has an access opening 16 for the introduction of the robot arm 10. A blasting device (not shown) is provided at the interior of the working chamber 12 and throws the blasting media in a blasting cone onto a working region inside the working chamber 12, with a workpiece held by the robot arm being located in said working region.

In the embodiment shown in FIG. 1, the chamber wall 14 is provided at its outer surface in the region of the access opening 16 with a peripheral housing flange 18 whose front face serves for contact with a sealing element 20 which is arranged at the robot arm 10.

The sealing element 20 is fastened to the outer periphery of the robot arm 10 and contacts a step 11 of the robot arm 10. The sealing element 20 is rotatably connected to the robot arm, that is it is rotatable about the longitudinal axis A of the robot arm and has a cross-section which is larger than that of the access opening 16. In the embodiment shown, the cross-section of the sealing element 20 is even somewhat larger than the external dimension of the housing flange 18 so that it is ensured that the sealing element 20 sealingly covers the access opening 16 when it is pressed against the chamber wall 14 by the robot arm.

In the embodiment shown in FIG. 1, at the start of a blasting process, the robot arm 10—together with a workpiece fastened to its front end—is introduced into the working chamber 12 through the access opening 16. Subsequently, the robot arm 10 is held pressed in the direction of the chamber wall 14 with a pre-determined minimum pressing force such that the sealing element 20 fastened to the robot arm 10 is held pressed against the housing flange 18 of the working chamber 12. A seal is hereby ensured between the robot arm 10 and the chamber wall 14, with a rotation of the robot arm 10 simultaneously being possible about the axis A, that is along the angle of rotation R, since a rotational movement is possible between the robot arm 10 and the sealing element 20 due to the rotatable fastening of the sealing element 20 to the robot arm 10. After the end of the blasting process, the robot arm 10 only has to be withdrawn, that is no further measures than a movement of the robot arm are necessary either for the establishing or for the canceling of the sealing engagement between the robot arm 10 and the chamber wall 14 since the sealing element 20 is brought into a sealing engagement with the chamber wall 14 solely by pressing the robot arm 10 against the chamber wall 14.

Figure 2:
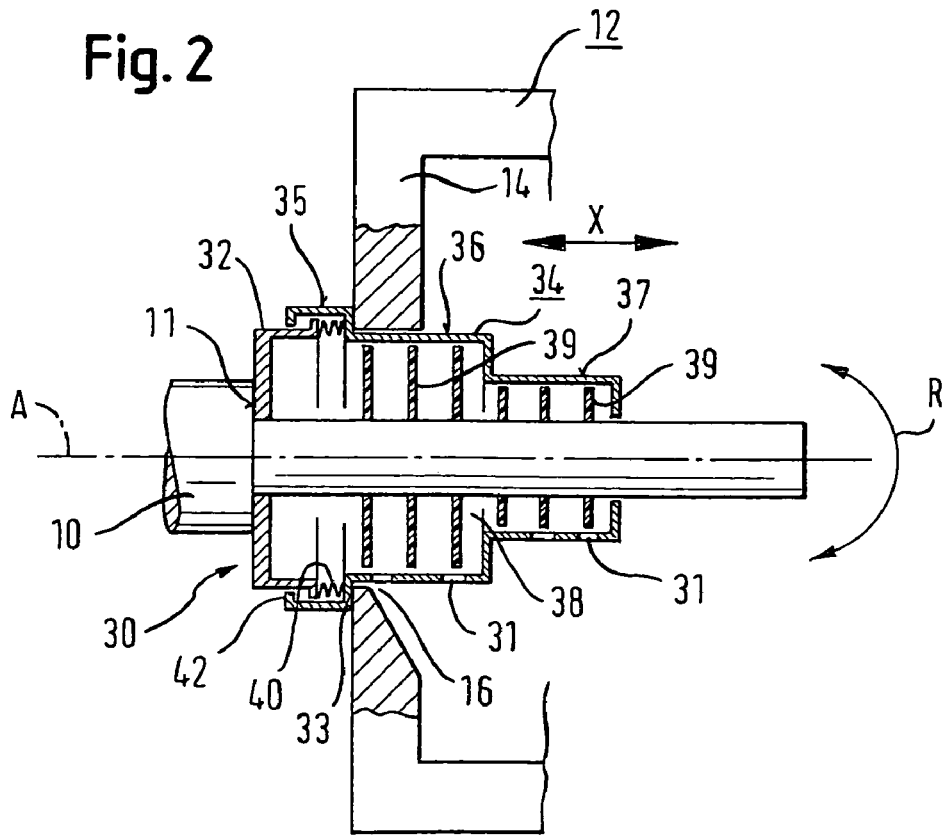
FIG. 2 a second embodiment of a working chamber.

A sealing element 30 is provided in the embodiment shown in FIG. 2 which is designed in multiple parts and permits both a rotation of the robot arm 10 about the angle R and a longitudinal movement along the axis A.

The sealing element 30 shown in FIG. 2 has a sealing flange 32 which is securely, that is non-rotatably, fastened to the robot arm 10 in the region of the step 11. The sealing flange 32 is rotatably connected to a sealing sleeve 34 which extends from the outside of the chamber wall 14 up to and into the interior of the working chamber 12. The sealing sleeve 34 has a total of three differently sized outer diameters, with the largest outer diameter 35 being located outside the working chamber 12. This largest outer diameter 35 merges via a stepped section forming a ring web 33 into a region with a medium outer diameter which approximately corresponds to the inner diameter of the access opening 16, with this section 36 already extending into the interior of the working chamber 12 with a medium outer diameter. A further region with the smallest outer diameter 37 adjoins via a further stepped section.

A hollow space 38 is thus formed between the sealing flange and the robot arm 10 by the sealing flange 32, with a plurality of rubber lamellae 39 with different outer diameters adapted to the inner diameter of the sealing sleeve 34 being arranged at the robot arm 10 in this hollow space. A labyrinth seal hereby results overall. A plurality of outlet openings 31 are provided at the lower side of the sealing sleeve 34 for blasting medium which has nevertheless penetrated into the hollow space 38 inside the sealing sleeve 34 and permit a discharge of blasting medium from the hollow space 38 into the interior of the working chamber.

The two parts 32 and 36 of the sealing element shown in FIG. 2, that is the sealing flange 32 and the sealing sleeve 36 are biased toward one another via compression springs 40. At the same time, the sealing sleeve 34 forms a stop 42 at its rear end such that the former cannot be separated from the sealing flange 32.

In the embodiment shown in FIG. 2, the robot arm 10 with the workpiece fastened to it must in turn only be moved through the access opening 16 into the interior of the working chamber 12 until the ring web 33 of the sealing sleeve 34 contacts the outer rim of the access opening 16. Subsequently, the robot arm 10 is pressed against the chamber wall 14 with a pre-determined minimum pressing force so that a seal is ensured between the robot arm 10 and the chamber wall 14.

Since the two parts 32 and 34 of the sealing element 30 are rotatable relative to one another, the robot arm 10 can be rotated about the axis A along the angle of rotation R. It is, however, furthermore also possible to displace the robot arm 10 into and out of the working chamber in the direction of the longitudinal axis A. If the robot arm 10 is moved into the working chamber, the springs 40 are compressed. On a withdrawal movement, the springs 40 apply the required minimum pressing force such that the sealing sleeve 36 is always pressed toward the chamber wall 14 even when the robot arm 10 withdraws from the working chamber 12. Not only a rotation along the angle of rotation R is thus possible during blasting operation, but also an oscillation in the direction X.

In the embodiment shown in FIG. 3, a rotation about the angle of rotation R as well as a longitudinal movement in the direction X are likewise possible when the robot arm 10 is located in a sealed manner inside the working chamber 12.

In this embodiment, a sealing element 50 is provided which has a sealing sleeve 51 which is rotatably fastened to the robot arm 10. The sealing sleeve 51 is made in pot shape and has a flange section 52 at its rear end which projects outwardly and with which the sealing sleeve 51 can be sealingly brought into contact with the rim of the access opening 16 of the chamber wall 14. A wiper rubber 53 is fastened to the front face of the sealing sleeve 51 in the region of the front discharge opening for the robot arm 10 and the robot arm 10 is inserted through this and provides a further seal.

A holding unit 60 is rotatably supported at the step 11 of the robot arm 10 and a plurality of guide columns 62 extending parallel to the axis A of the robot arm 10 are fastened to it. The guide columns 62 are displaceable along the axis A relative to the holding unit 60 and have an end abutment 63 at their rear ends. A plurality of springs 64, which bias the sealing sleeve 51 relative to the robot arm 10, are provided between the holding unit 60 and the inner front end of the sealing sleeve 51.

The robot arm 10 is provided with additional rubber bellows 59 for a seal at the interior of the hollow space 58 formed by the sealing sleeve 51.

It is again sufficient in the embodiment shown in FIG. 3 for the robot arm 10 with the workpiece fastened to it to be introduced into the interior of the working chamber 12 until the flange section 52 of the sealing sleeve 51 sealingly contacts the outer periphery of the access opening 16 before a blasting process. Subsequently, the robot arm 10 is pressed against the chamber wall 14 with a pre-determined minimum pressing force so that the sealing engagement is maintained. In this state, a rotation is possible about the axis A along the angle of rotation R. The robot arm 10 can moreover also be moved along the axis A in the direction X. When the robot arm 10 moves further to the right out of the position shown in FIG. 3, the springs 64 are compressed and the guide columns 62 move rearwardly out of the holding unit 60. It is hereby possible for the robot arm 10 to be sealingly pushed into the interior of the working chamber 12 by a distance which approximately corresponds to the depth of the sealing sleeve 51. If the robot arm 10 is subsequently withdrawn from the working chamber 12 along the axis A, the sealing engagement between the sealing sleeve 51 in the chamber wall 14 is maintained due to the force of the springs 64.

In the embodiment shown in FIG. 4, the sealing element 70 has a sealing sleeve 71 which substantially corresponds to the sealing sleeve 51 of FIG. 3, with slit-like discharge openings 72, however, being provided at the lower side of the sealing sleeve 71 for the discharge of blasting medium. A wiper rubber 73 is in turn fastened to the front outer end face of the sealing sleeve 71 and provides a seal with respect to the robot arm 10. In this embodiment, a second sealing sleeve 74 is provided in the region of the step 11, is likewise made in pot shape and has a somewhat smaller outer diameter than the inner diameter of the sealing sleeve 71 such that both sleeves can be plugged into one another. A spring 75 is provided between the base of the sealing sleeve 74 and the base of the sealing sleeve 71 and biases both sleeves toward one another.

In this embodiment, both a rotation about the axis A along the angle R and a longitudinal displacement in the direction X are also possible, with a seal being maintained between the robot arm 10 and the housing wall 14. If the robot arm 10 is displaced further to the right out of the position shown in FIG. 4, the spring 75 is compressed and the sealing sleeve 74 penetrates further into the interior of the sealing sleeve 71. On a withdrawing movement, the spring 75 ensures that the sealing sleeve 71 continues to be pressed against the chamber wall 14. Only when the sealing sleeve 71 has achieved an abutment (not shown) at the sealing sleeve 71 is the sealing sleeve 71 released from the chamber wall 14.

What is claimed is:

1. A working chamber for a blasting plant which is provided with a robot arm for the manipulation of a workpiece to be blasted and having a chamber wall which has an access opening for the introduction of the robot arm, with a sealing device being provided in the region of the access opening and making a seal between the robot arm and the chamber wall, the working chamber comprising: a sealing element fastened to the robot arm, rotatable about a longitudinal axis of the robot arm and relative to the robot arm and providing a seal between the robot arm and the chamber wall when the robot arm is introduced into the working chamber, wherein the sealing element is brought into a sealing engagement with the chamber wall solely by pressing the robot arm against the chamber wall.

* * * * *